(12) United States Patent
Abe et al.

(10) Patent No.: US 6,671,314 B1
(45) Date of Patent: Dec. 30, 2003

(54) DECISION FEEDBACK EQUALIZER FOR A DIGITAL SIGNAL RECEIVING SYSTEM

(75) Inventors: Yoshinori Abe, Tokyo-to (JP); Kazushi Tahara, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/528,174

(22) Filed: Mar. 17, 2000

(30) Foreign Application Priority Data

Mar. 17, 1999 (JP) ............................................ 11-072631
Oct. 14, 1999 (JP) ............................................ 11-292584

(51) Int. Cl.[7] .............................................. H03H 7/30
(52) U.S. Cl. ...................................................... 375/233
(58) Field of Search ................................ 375/233, 232; 348/614, 611; 333/28 R

(56) References Cited

U.S. PATENT DOCUMENTS 6,012,161 A * 1/2000 Ariyavisitakul et al. .... 714/795
6,222,592 B1 * 4/2001 Patel .......................... 348/614

* cited by examiner

*Primary Examiner*—Stephen Chin
*Assistant Examiner*—Kevin Kim
(74) *Attorney, Agent, or Firm*—Nixon & Vanderhye PC

(57) ABSTRACT

The adder subtracts the estimated echo from the input symbol to generate the demodulated symbol, and the Trellis decoder applies Trellis decoding onto the demodulated symbol to generate maximum likelihood transmission symbol sequence. The feedback register stores estimated transmission symbol values for a feedback filter, and A coefficient register stores coefficient values for the feedback filter. The feedback register updating unit generates the estimated transmission symbol and the estimated transmission symbol value corresponding to the next time point based on the demodulated symbol, the maximum likelihood transmission symbol sequence and the estimated transmission symbol corresponding to a current time point, and updates the values stored in the feedback register by using the estimated transmission symbol value corresponding to the next time point. The coefficient updating unit updates the values stored in the coefficient register based on the demodulated symbol and the estimated transmission symbol. The estimated echo calculator calculates the estimated echo based on the values stored in the feedback register and the values stored in the coefficient register.

19 Claims, 14 Drawing Sheets

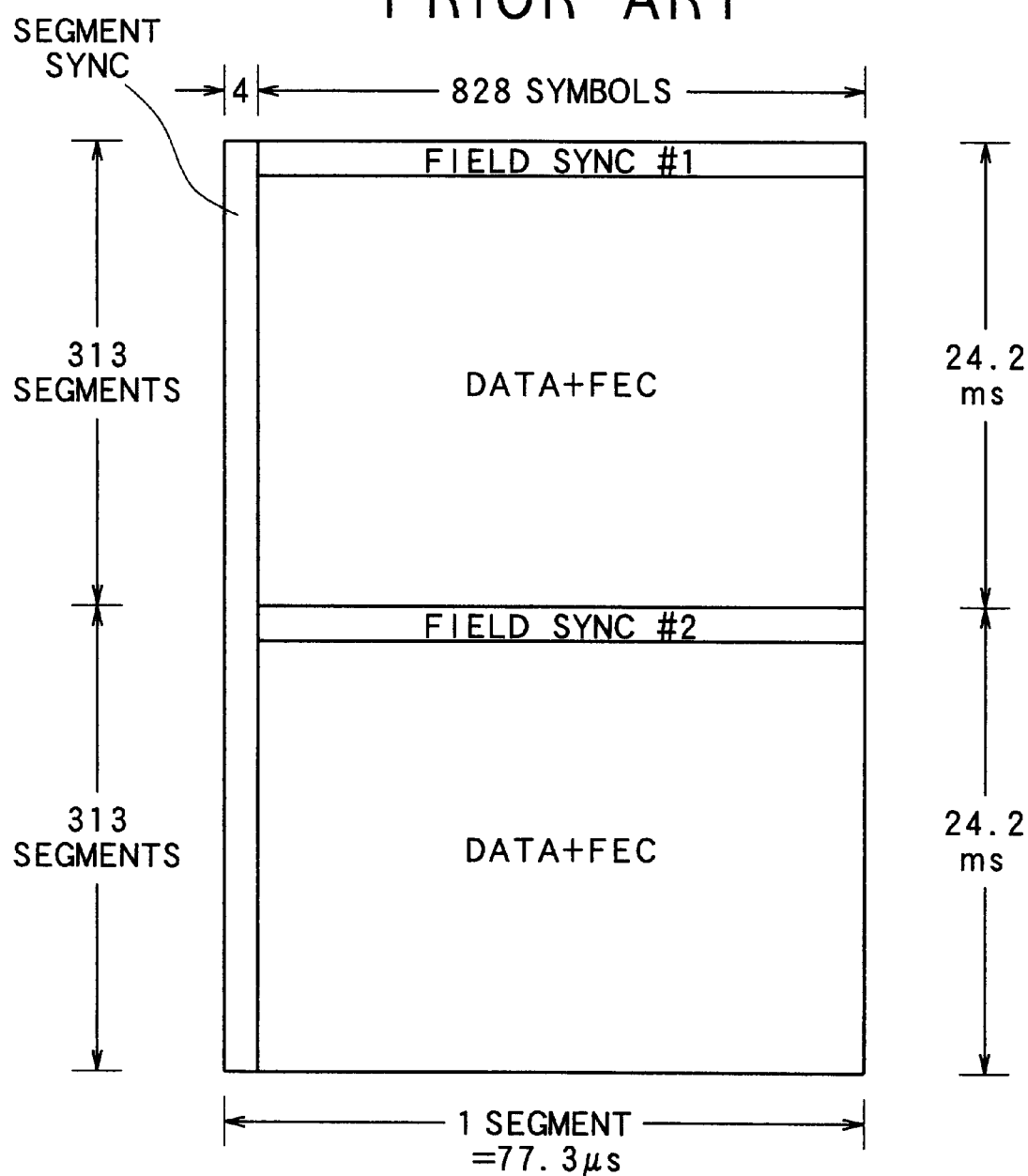

FIG.6

| Area | Position of symbol in data frame | Condition of frame counter value |
|---|---|---|
| A | In data segment sync | $Sym_k < 4$ |
| B | In PN511, PN63, VSBmode in data field sync | $Seg_k = 0$ & $4 \leq Sym_k < 724$ |
| C | In Reserved region in data field sync | $Seg_k = 0$ & $724 \leq Sym_k < 820$ |
| D | In last 12 symbols in data field sync | $Seg_k = 0$ & $820 \leq Sym_k$ |
| E | In data symbol period | $Seg_k \neq 0$ & $4 \leq Sym_k$ |
| F | In last 12 symbols in data segment immediately before data field sync | $Seg_k = 312$ & $820 \leq Sym_k$ |

IDEAL:NO ECHO

SIMPLE:DFE USING 8-VALUE SLICER(ECHO EXISTS)

PROPOSED:DFE OF THE PRESENT INVENTION(ECHO EXISTS)
  ·THE ERROR RATE IS OBSERVED AT OUTPUT OF TRELLIS DECODER HAVING PATH MEMORY LENGTH 20
  ·ECHO:DELAY=240 TAPS, GAIN=−6dB
  ·L IS NUMBER OF TAP OF FEEDBACK REGISTER,WHICH IS SUBJECTED TO THE UPDATING

DECISION FEEDBACK EQUALIZER FOR A DIGITAL SIGNAL RECEIVING SYSTEM

BACKGROUND OF THE INVENTION

1. Field of the Invention

The present invention relates to a video/audio decoding technique in conformity with ATSC (Advanced Television Systems Committee) standard, and more particularly to an equalization in a signal receiving system.

2. Description of Related Art

As a modulation system for a terrestrial digital broadcasting in the United States, the Trellis-encoded 8VSB modulation in conformity with the ATSC standard is employed. The received signal of the terrestrial broadcasting includes a lot of echo signals, and the configuration of the adaptive equalizer greatly affects the demodulation performance. As a result of field tests carried out until now, it has been pointed out that the high-speed adaptive equalization by using a Decision Feedback Equalizer (DFE) having about 256 taps is required.

In the configuration of DFE, the estimation accuracy of the estimated transmission symbol value, which is used for echo-signal cancellation and the adaptive updating of the equalization coefficients, is important. In a conventional equalizer configuration, a simple 8-value slicer has been used for the purpose of the transmission symbol estimation. However, in such a case, the estimation accuracy of the transmission symbol is low, and appropriate equalization cannot be achieved around the allowable error rate limit of the system.

SUMMARY OF THE INVENTION

It is an object of the present invention to provide a decision feedback equalizer for use in a signal receiving system, which is capable of performing high-performance equalization compared with the conventional DFE with 8-value slicer, without an unacceptable increase of the hardware scale.

According to one aspect of the present invention, there is provided a decision feedback equalizer for use in a digital signal receiving system, including: an adder for subtracting an estimated echo from an input symbol to generate a demodulated symbol; a Trellis decoder for applying Trellis decoding onto the demodulated symbol to generate maximum likelihood transmission symbol sequence; a feedback register for storing estimated transmission symbol values for a feedback filter; a coefficient register for storing coefficient values for the feedback filter; a feedback register updating unit for generating an estimated transmission symbol and the estimated transmission symbol value corresponding to a next time point based on the demodulated symbol, the maximum likelihood transmission symbol sequence and the estimated transmission symbol corresponding to a current time point, and for updating the values stored in the feedback register by using the estimated transmission symbol value corresponding to the next time point; a coefficient updating unit for updating the values stored in the coefficient register based on the demodulated symbol and the estimated transmission symbol; and an estimated echo calculator for calculating the estimated echo based on the values stored in the feedback register and the values stored in the coefficient register.

In accordance with the equalizer thus configured, the adder subtracts the estimated echo from the input symbol to generate the demodulated symbol, and the Trellis decoder applies Trellis decoding onto the demodulated symbol to generate maximum likelihood transmission symbol sequence. The feedback register stores estimated transmission symbol values for a feedback filter, and the coefficient register stores coefficient values for the feedback filter. The feedback register updating unit generates the estimated transmission symbol and the estimated transmission symbol value corresponding to the next time point based on the demodulated symbol, the maximum likelihood transmission symbol sequence and the estimated transmission symbol corresponding to a current time point, and updates the values stored in the feedback register by using the estimated transmission symbol value corresponding to the next time point. The coefficient updating unit updates the values stored in the coefficient register based on the demodulated symbol and the estimated transmission symbol. The estimated echo calculator calculates the estimated echo based on the values stored in the feedback register and the values stored in the coefficient register.

Thus, the values stored in the feedback register are updated by the highly-accurate maximum likelihood transmission symbol sequence which is generated by Trellis-decoding the demodulated symbol, and hence the optimum echo cancellation and equalization can be achieved.

The Trellis decoder may output a decoding result corresponding to the maximum likelihood transmission symbol sequence. Thus, the decoding result may be obtained without providing a separate Trellis decoder at the downstream of the equalizer. This enables downsizing of the receiver.

The feedback register updating unit may update the values stored in the feedback register by using the maximum likelihood transmission symbol sequence. Thus, the values stored in the feedback register are updated at every moment based on the maximum likelihood transmission symbol sequence, and hence more accurate estimated echo valued may be obtained.

The feedback register updating unit may calculate the estimated transmission symbol corresponding to a past input symbol by using the maximum likelihood transmission symbol sequence which is calculated by the Trellis decoder and corresponds to input symbol until a current time point, and may update the values stored in the feedback register by using the estimated transmission symbol corresponding to the past input symbol. By this, the feedback register updating unit generates the highly-accurate estimated transmission symbols corresponding to the past symbols by using the newly obtained maximum likelihood transmission symbol sequence, thereby improving the echo canceling accuracy.

In a preferred embodiment, the Trellis decoder may apply the Trellis decoding only to data symbols included in the demodulated symbols. In another preferred embodiment, the Trellis decoder may receive a frame counter value indicating a position of the demodulated symbol within a data frame, and may apply the Trellis decoding only to the data symbols based on the frame counter value. In still another preferred embodiment, the feedback register updating unit may receive a frame counter value indicating a position of the demodulated symbol within a data frame, and may update the values stored in the feedback register by using the estimated transmission symbol corresponding to the past input symbol, only for the data symbols based on the frame counter value. Thus, it is ensured that the Trellis-decoding is applied only to the data symbols.

The maximum likelihood transmission symbol sequence may be an aggregation of the maximum likelihood estimated transmission symbols corresponding to current and past input symbols. Thus, the values stored in the feedback register may be stored in consideration of the estimated transmission symbol corresponding to the past input symbol.

The coefficient updating unit may update the values stored in the coefficient register corresponding to a next time point based on the demodulated symbol, the estimated transmission symbol, the estimated transmission symbol value of a current time point and the coefficient value of the current time point. Also, the data symbol corresponding to the input symbol supplied to the equalizer may be interleaved by a plurality of Trellis encoders, and the Trellis decoder may include a plurality of Trellis decoding units for de-interleaving the demodulated symbol.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3 is a diagram showing the data structure according to the ATSC standard;

FIG. 6 is a table showing the correspondence between the symbol position in the data frame and the frame counter value;

DETAILED DESCRIPTION OF THE PREFERRED EMBODIMENTS

The preferred embodiment of the present invention will now be described below with reference to the attached drawings.

[1] Outline of ATSC Standard

Prior to the description of the preferred embodiment of the present invention, the general description will be given of a signal transmission system and a signal specification of the ATSC standard.

Figure 1:
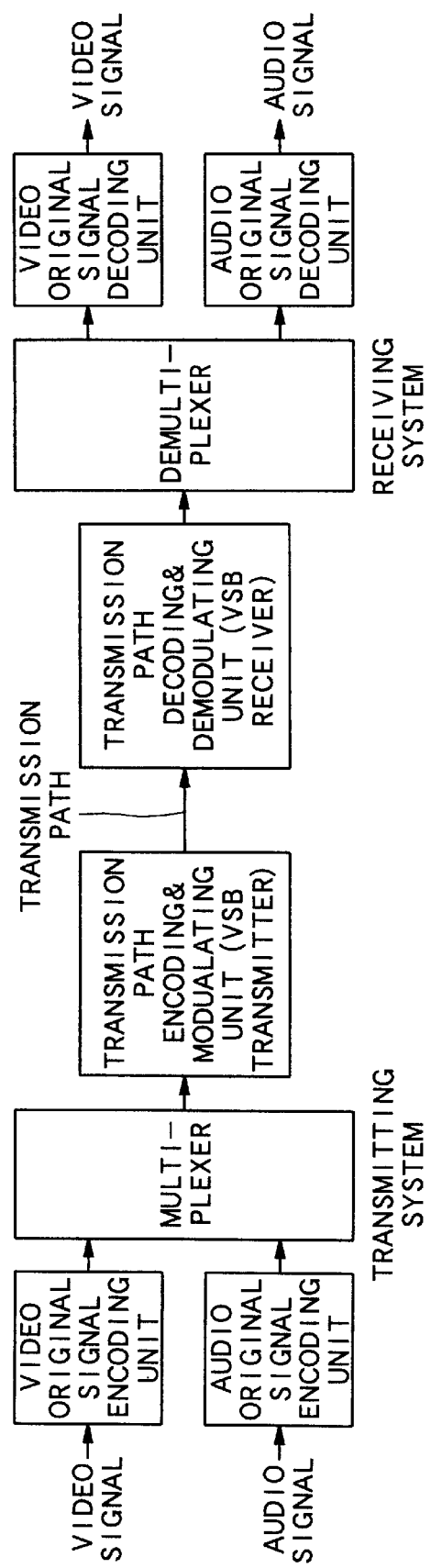
FIG. 1 is a schematic block diagram of transmitting and receiving systems according to the ATSC standard.
Figure 2A:
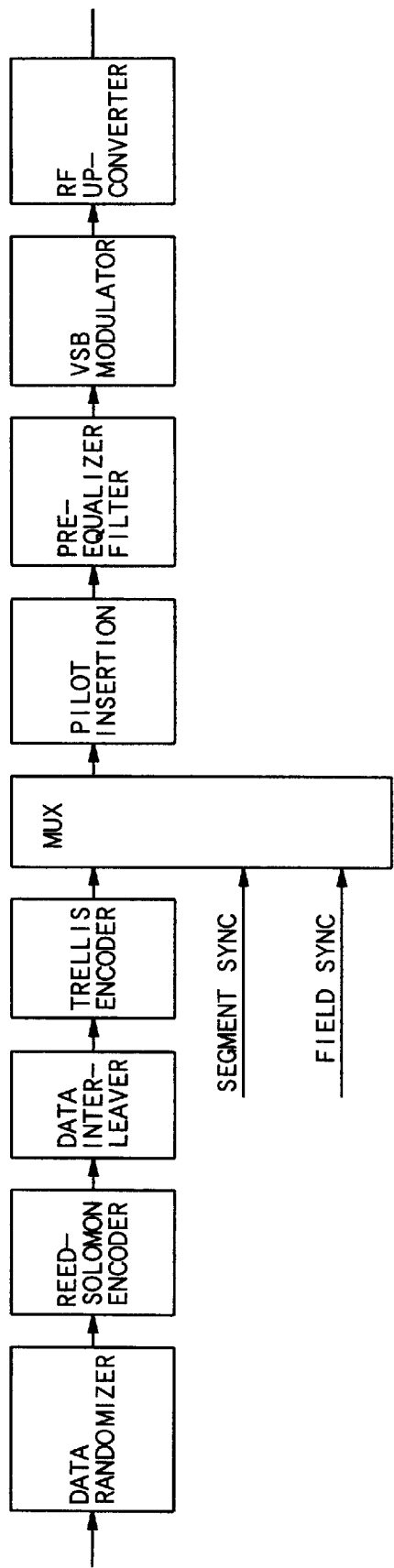
FIG. 2A is a block diagram showing a transmission path encoding/modulating unit shown in FIG. 1.

FIG. 1 is a schematic diagram of a system according to the ATSC standard. As illustrated, the transmitting system applies the encoding processing onto the video original signal to be transmitted and the audio original signal to be transmitted independently of each other, multiplexes them by a predetermined method and then supplies them to the transmission path encoding and modulating unit. As shown in FIG. 2A, the transmission path encoding and modulating unit applies the data randomization, the Reed-Solomon encoding, the convolutional data interleaving and the Trellis encoding onto the inputted multiplexed signal. Then, the transmission path encoding and modulating unit adds the syncs and further adds the pilot signal, and then applies the equalization and VSB-modulation. Finally, the transmission path encoding and modulating unit transmits the VSB-modulated signal as the RF signal.

Figure 2B:
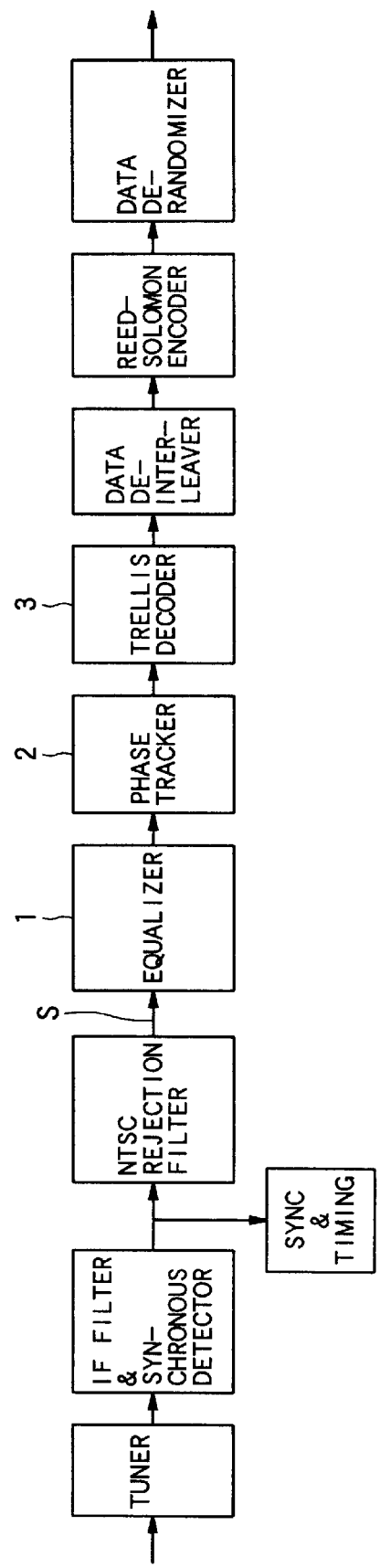
FIG. 2B is a block diagram showing a transmission path decoding/demodulating unit shown in FIG. 1.

On the other hand, the receiving system basically performs the reverse processing to the transmitting system. Namely, the transmission path decoding and demodulating unit shown in FIG. 2B receives the transmitted RF signal and detects the syncs and the timing signal. Then, the transmission path decoding and demodulating unit eliminates the NTSC signal, if necessary, and applies the waveform equalization, the phase processing, the Trellis decoding, the de-interleaving, the Reed-Solomon decoding and the de-randomization to recover the multiplexed signal of the video signal and the audio signal. Then, the transmission path decoding and demodulating unit performs de-multiplexing to obtain the video signal and the audio signal, and decodes them to reproduce the video original signal and the audio original signal. The equalization process according to the present invention mainly corresponds to the waveform equalization process shown in FIG. 2B.

Figure 4A:
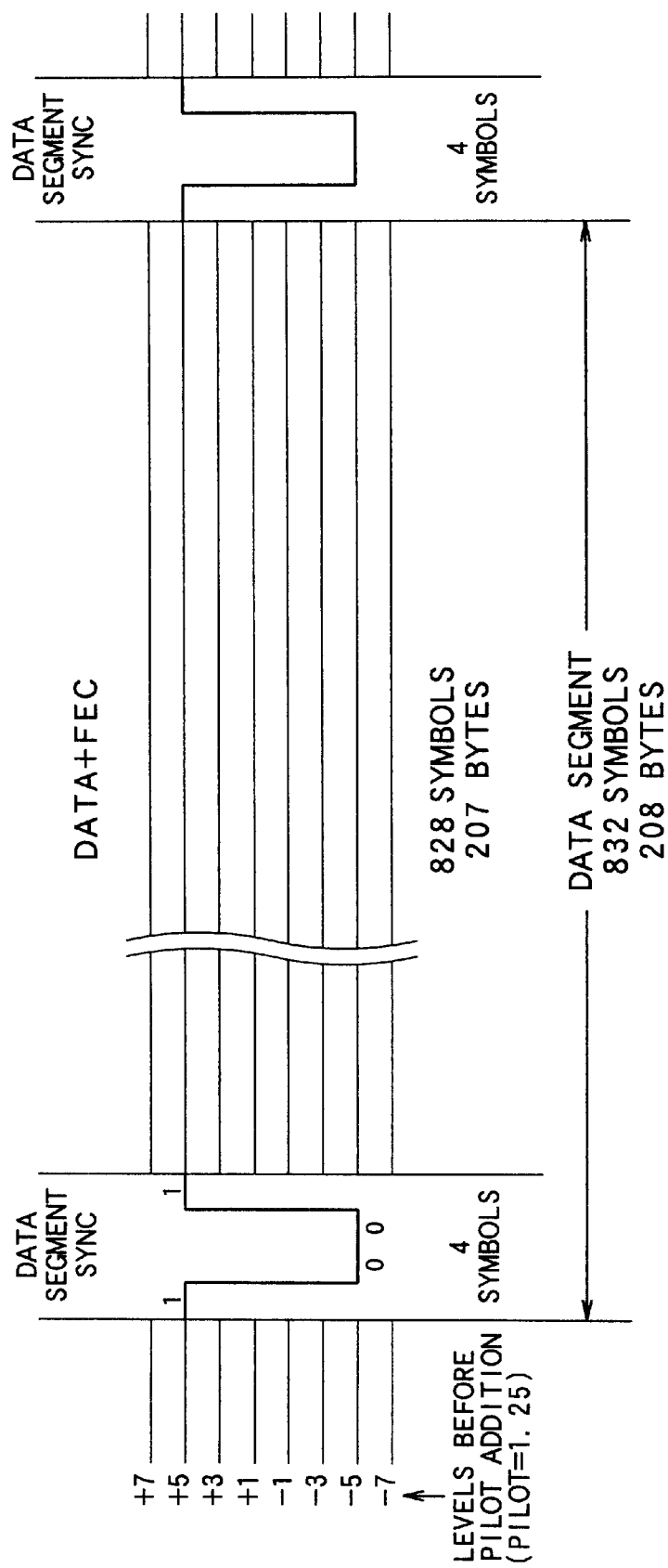
FIG. 4A is a diagram showing the data structure of the data segment shown in FIG. 3.
Figure 4B:
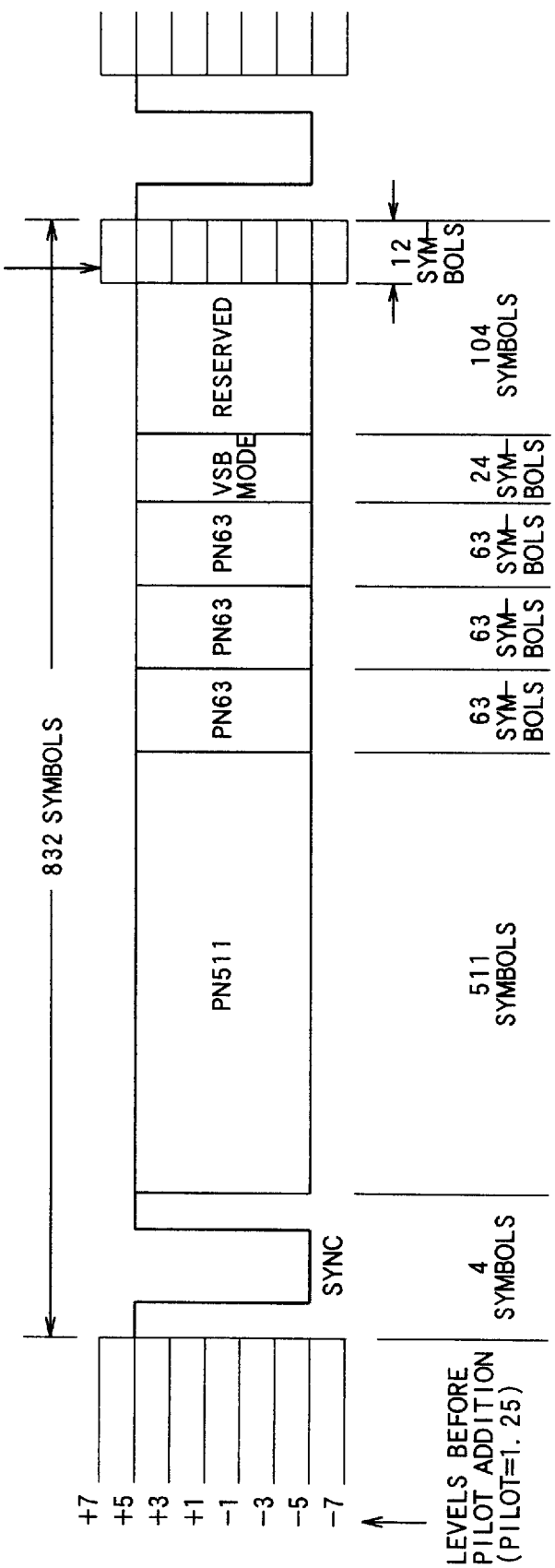
FIG. 4B is a diagram showing the data structure of the data field sync shown in FIG. 3.

Next, the data structure of the VSB data transmitted via the system shown in FIG. 1 will be described with reference to FIGS. 3 and 4. As shown in FIG. 3, the VSB data frame includes two data fields, each having 313 data segments. The first data segment of the data field is the data field sync as shown in FIG. 4B, and the remaining 312 data segments are the data segments shown in FIG. 4A. As shown in FIG. 4A, each data segment includes data segment sync of 4 symbols, and the following data symbol region of 828 symbols. The audio and video data to be transmitted are transmitted and received as the data symbols within the data symbol region. As shown in FIG. 4B, the data field sync includes the sync of the initial 4 symbols, the following pseudo-random sequence (PN511 and PN63), the VSB mode signal and the reserved space. Further, at the portion of the last 12 symbols of the data field sync (hereinafter referred to as "precode area"), the last 12 symbols of the previous data segment are duplicated.

[2] Decision Feedback Equalizer

Next, the decision feedback equalizer according to the present invention will be described. The decision feedback equalizer according to the present invention (hereinafter also referred to as "an intelligent equalizer") carries out the waveform equalization by using the maximum likelihood transmission symbol sequence (i.e., an estimated transmission symbol sequence corresponding to the maximum likelihood surviving path) obtained in the demodulation process by the Trellis decoder.

Figure 5:
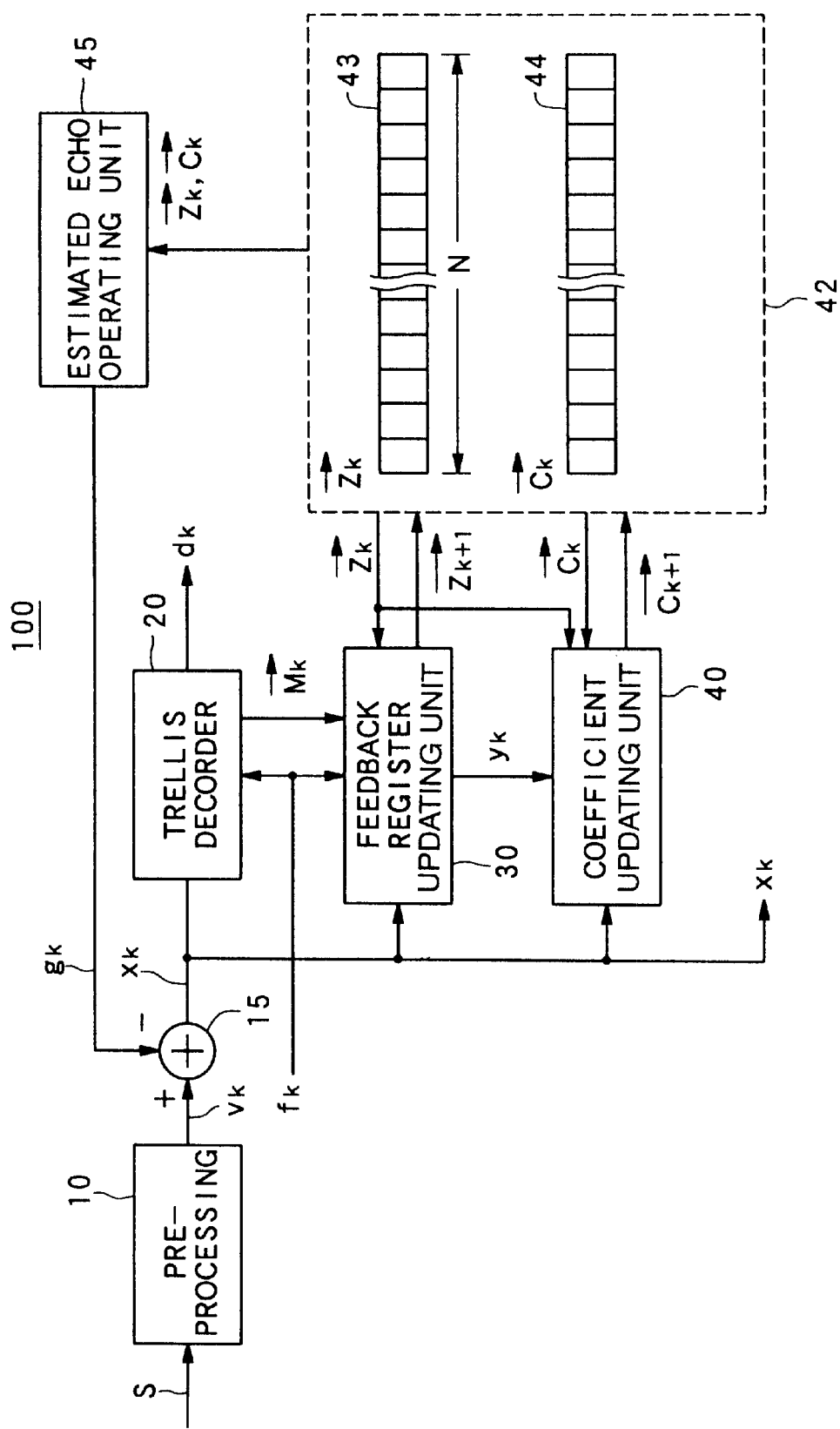
FIG. 5 is a block diagram showing the configuration of the decision feedback equalizer according to the present invention.

FIG. 5 is a schematic diagram of the intelligent equalizer 100. The intelligent equalizer 100 of the present invention is arranged at the waveform equalizing stage within the VSB receiving system in conformity with the ATSC standard, and is basically used as the equalizer 1 shown in FIG. 2B. Referring to FIG. 5, the intelligent equalizer 100 roughly includes a pre-processing unit 10, an adder 15, a Trellis decoder 20, a feedback register updating unit 30, a coefficient updating unit 40, a register unit 42 and an estimated echo operating unit 45. The register unit 42 includes a feedback register 43 and a coefficient register 44.

To the pre-processing unit 10, the symbols S in conformity with the VSB data structure described with reference to FIGS. 3 and 4 are sequentially inputted. The pre-processing unit 10 carries out necessary pre-processing such as a DC-bias elimination, and supplies the pre-processed symbols $v_k$ to the adder 15. It is noted that the subscript "k" of each data indicates a time point (corresponding to a single symbol) in the following description.

The adder 15, the Trellis decoder 20, the feedback register updating unit 30, the coefficient updating unit 40, the register unit 42 and the estimated echo operating unit 45 constitute a feedback FIR filter. The adder 15 receives the estimated echo signal $g_k$ calculated by the estimated echo operating unit 45 at one input. The adder 15 subtracts the estimated echo signal $g_k$ from the inputted symbol $v_k$ to output the demodulated symbol $x_k$. The demodulated symbol $x_k$ is supplied to the Trellis decoder 20, the feedback register updating unit 30 and the coefficient updating unit 40. The Trellis decoder 20 applies the Trellis decoding onto the data symbols included in the inputted demodulated symbol $x_k$ to generate the maximum likelihood transmission symbol sequence $M_k$, and supplies it to the feedback register updating unit 30. The Trellis decoder 20 outputs the decoded result $d_k$, if necessary.

The feedback register updating unit 30 also receives the frame counter value $f_k$ indicating the position of the inputted symbol $v_k$ within the data frame, and decides the estimated transmission symbol $y_k$ and a new feedback register vector $Z_{k+1}$ based on the frame counter value $f_k$, the maximum likelihood transmission symbol sequence $M_k$ and the feedback register vector $Z_k$ at the previous time point. Then, the feedback register updating unit 30 stores the new feedback register vector $Z_{k+1}$ thus decided into the feedback register 43 of the register unit 42, and supplies the estimated transmission symbol $y_k$ to the coefficient updating unit 40. The coefficient updating unit 40 calculates the coefficient vector $C_{k+1}$ for the next time point based on the demodulated symbol $x_k$, the estimated transmission symbol $y_k$, the feedback register vector $Z_k$ and the coefficient vector $C_k$ so that the optimum echo canceling characteristic can be obtained, and then stores the coefficient vector $C_k$ in the coefficient register 44 in the register unit 42. The estimated echo operating unit 45 calculates the scalar product of the feedback register vector $Z_k$ and the coefficient vector $C_k$ both stored in the register unit 42, generates the estimated echo signal $g_k$ and supplies it to the adder 15. As the time point of the input symbol $v_k$ advances, the feedback register updating unit 30 and the coefficient updating unit 40 update the feedback register vector $Z_k$ and the coefficient vector $C_k$, respectively, and thus the feedback filter is adaptively controlled to have an optimum echo cancellation characteristic.

It is noted that the feedback register vector $Z_k$, the coefficient vector $C_k$ and the maximum likelihood transmission symbol sequence M are defined as follows:

Feedback Register Vector $Z_k = \{Z_k^1, Z_k^2, \ldots, Z_k^N\}$
Coefficient Vector $C_k = \{C_k^1, C_k^2, \ldots, c_k^N\}$
Maximum Likelihood Estimated Transmission Symbol Sequence $Mk = \{m_k^D, m_k^1, \ldots, m_k^{L-1}\}$ wherein L is an integer larger than 1
$m_k^D$: Maximum likelihood estimated transmission symbol at current time point k for $x_k$
$m_k^n$: Maximum likelihood estimated transmission symbol at current time point k for demodulated symbol inputted to the Trellis decoder n-times before Next, the operation of the intelligent equalizer 100 will be described in detail. First, the description will be given of the frame counter value $f_k$ which is used in the Trellis decoder 20 and the feedback register updating unit 30. To the intelligent equalizer 100, each symbol in the aforementioned VSB data frame is sequentially inputted. Therefore, the input to the intelligent equalizer 100 includes not only the data symbols corresponding to the signal to be transmitted but also the non-data symbols corresponding to the portions of the sync and the predetermined control signal. Here, the data symbols are Trellis-encoded, but the non-data symbols (e.g., the symbols within the segment sync and the data field sync) are not Trellis-encoded. Since the decoding is applied only to the Trellis-encoded data symbols in Trellis decoder 20, the decoding processing should be performed with discriminating the data symbol in the inputted symbol sequence from the non-data symbols in the symbol sequence. For this purpose, this embodiment introduces the concept of frame counter value $f_k$. The frame counter value $f_k$ indicates the position of the (demodulated) input symbol ($x_k$) within the data frame and is expressed as follows:

Frame counter value $f_k = \{FLD_k, Seg_k, Sym_k\}$
$FLD_k$: Field counter value, which is "0" or "1"
$Seg_k$: Segment counter value, between 0 to 312
$Sym_k$: Symbol counter value, between 0 to 831

FIG. 6 is a table showing the correspondence between the areas in the data frame and the frame counter values of the symbols within the respective areas. It is noted that the areas are classified into Areas A to F for the sake of brevity. As seen from FIGS. 3 and 4, the Area-A corresponds to the initial four symbols in each data segment, and belongs to the data segment sync (DSS). In this Area-A, the segment counter value $Sym_k$ is less than "4". The Area-B corresponds to the known random sequences PN511 and PN63 and VSB mode in the data field sync. In this Area-B, the segment counter value $Seg_k$ is "0"and the symbol counter value $Sym_k$ is no less than "4" and less than "724". The Area-C corresponds to the reserve area within the data field sync. In this Area-C, the segment counter value $Seg_k$ is "0" and the symbol counter value $Sym_k$ is no less than "724" and less than "820". The Area-D corresponds to the last 12 symbols in the data field sync. In this Area-D, the segment counter value $Seg_k$ is "0" and the symbol counter value $Sym_k$ is no less than "820". The Area-E corresponds to the data symbol period wherein the segment counter value $Seg_k$ is not "0" and the symbol counter value $Sym_k$ is no less than "4". The Area-F corresponds to the last 12 symbols of the data segment immediately before the data field sync. In this Area-F, the segment counter value $Seg_k$ is "312" and the symbol counter value $Sym_k$ is no less than "820". As mentioned above, at the last 12 symbols in the data field sync (i.e., symbols in the Area-D), the last 12 symbols of the data segment immediately before it (i.e., the symbols in the Area-F) are duplicated.

Next, the operation of the intelligent equalizer 100 will be described with reference to the configuration diagram in FIG. 5 and the flowcharts in FIGS. 7 to 11.

Figure 7:
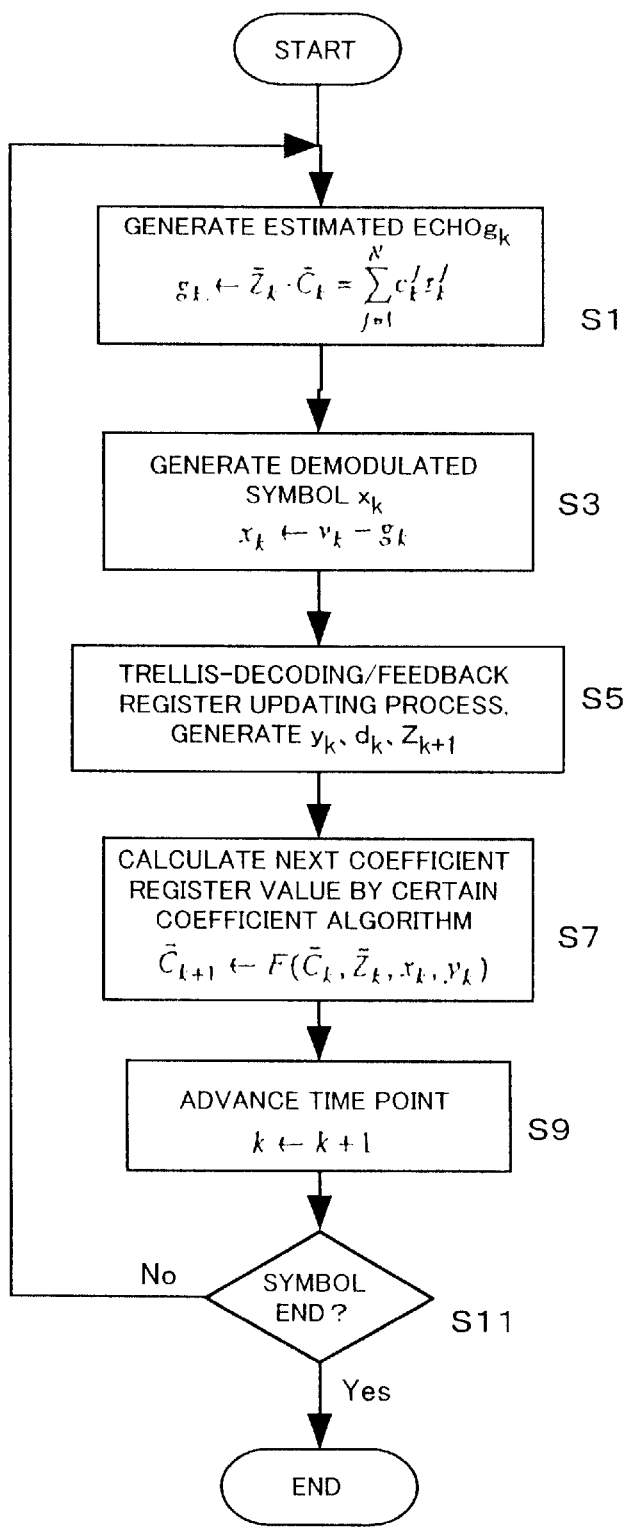
FIG. 7 is a flowchart showing the main routine of the operation of the decision feedback equalizer according to the present invention.

FIG. 7 shows the main routine of the operation of the intelligent equalizer 100. It is noted that FIG. 7 shows the processing by the intelligent equalizer 100 at normal status, wherein the symbols received by the receiving system are being sequentially inputted. In FIG. 7, first the estimated echo operating unit 45 calculates the estimated echo value $g_k$ (step S1). Then, the adder 15 subtracts the calculated estimated echo value $g_k$ from the input symbol $v_k$ to obtain the demodulated symbol $x_k$ (step S3).

Then, the Trellis decoder 20 and the feedback register updating unit 30 execute the Trellis-decoding/the feedback register updating processing, respectively (step S5). This processing generates the maximum likelihood transmission symbol sequence $M_k$, the estimated transmission symbol $y_k$, the feedback register vector $Z_{k+1}$ corresponding to the next time point and, if necessary, the Trellis decoded output $d_k$ by using the demodulated symbol $x_k$, the frame counter value $f_k$ and the feedback register vector $Z_k$ of the current time point, and the detail thereof will be described later. When the Trellis-decoding/feedback register updating processing is finished, the coefficient updating unit 40 calculates the coefficient vector $C_{k+1}$ corresponding to the next time point from the demodulated symbol $x_k$, the estimated transmission symbol $y_k$, the feedback register vector $Z_k$ of the current time point and the coefficient vector $C_k$ of the current time point, according to an appropriate coefficient updating algorithm such as Least Mean Square algorithm (step S7). Then, the time point is advanced by one (step S9), and it is determined whether or not next symbol exists (step S11). As long as the symbol is being inputted, the steps S1 to S11 are repeated to continue the echo cancellation and equalization processing.

Figure 8:
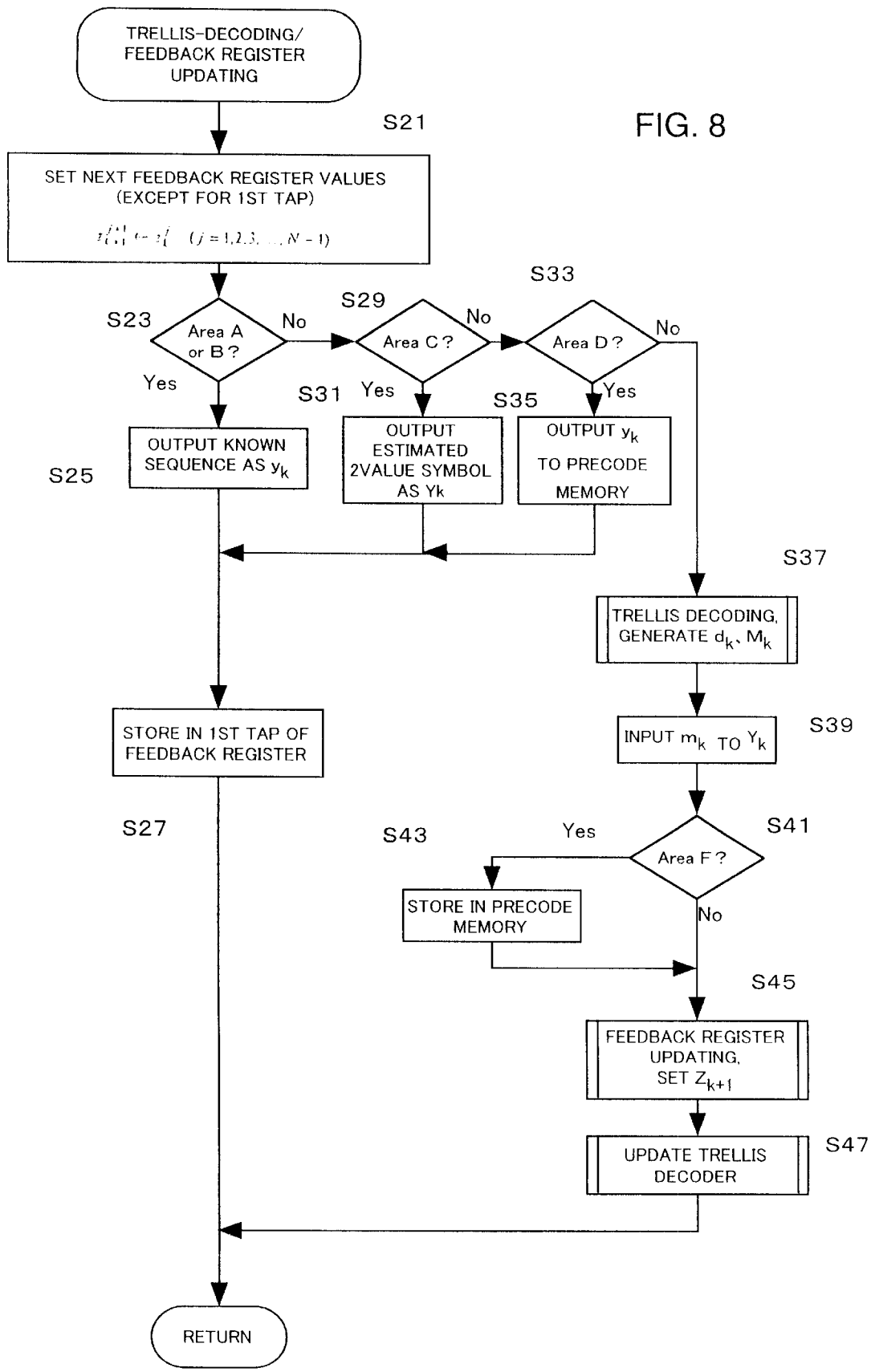
FIG. 8 is a flowchart showing the Trellis decoding/ feedback register updating process in FIG. 7.

Next, the Trellis-decoding/feedback register updating processing performed in step S5 of the main routine will be described with reference to FIG. 8. Now, it is assumed that the length (i.e., tap length, see. FIG. 5) of the feedback register 43 is "N". In this processing, in order to determine the feedback register vector $Z_{k+1}$ corresponding to the next time point, the current values in the feedback register 43 are shifted by one to determine the feedback register values for the taps other than the first tap (step S21). Namely, in the feedback register 43, the value stored in the first tap is put into the second tap, the value stored in the second tap is put into the third tap, . . . and so on. Thus, the values in each tap are shifted to determine the values other than the first tap.

Then, the position of the next time point (i.e., next symbol) within the data frame is determined based on the frame counter value $f_k$ in steps S23, S29 and S33. This is because the input symbols include not only data symbols but also various non-data symbols as shown in FIG. 6, and hence discrimination of those symbols is needed. Therefore, first it is determined whether or not the next symbol corresponds to the data symbol, and if it corresponds to the data symbol, the Trellis decoding is carried out in the processing at the following stage. If it does not correspond to the data symbol, the symbol is not Trellis-decoded and hence corresponding values are simply outputted.

More specifically, first, it is determined whether the next symbol belongs to the Area-A or Area-B shown in FIG. 6. If Yes, the next symbol is a known value (i.e., it is in the data segment sync or the known random sequence). Hence, the corresponding value is determined based on the frame counter value $f_k$ and the value thus determined is inputted to the first tap of the feedback register 43 (step S27). Then, the process goes back to the main routine. If the next symbol does not belong to the Area-A and Area-B, then it is determined whether or not the next symbol belongs to the Area-C (step S29). If Yes, the symbol belongs to the reserve region of the data field sync (see. FIG. 4B). Since this region generally has one of the "+5" and "−5", the transmission symbol is estimated based on the polarity of the input symbol $x_k$. Namely, if the input symbol $x_k$ is positive, the value is estimated to be "+5" and if the input symbol $x_k$ is negative, the value is estimated to be "−5" (step S31). Then, the estimated value is inputted to the first tap (step S27), and the process goes back to the main routine.

If the next symbol does not belong to the Area-A to Area-C, then it is determined whether it belongs to the Area-D (step S33). If it belongs to the Area-D, the symbol is one of the last 12 symbols in the data field sync, which is the precode area where the last 12 symbols of the data segment immediately before are duplicated. The 12 symbols in the precode area are stored in a given memory (hereinafter referred to as "precode memory") in advance during the processing of the previous data segment. Therefore, the corresponding value is read out from the precode memory based on the frame counter value $f_k$ (step S35), and the value is inputted to the first tap of the feedback register 43 (step S27). Then, the process returns to the main routine.

If the next symbol does not belong to any one of the Area-A to Area-D, the symbol is a data symbol and is subject to the Trellis-decoding. According to the ATSC standard, the data symbols to be transmitted are interleaved by 12 Trellis-encoders, and hence the data symbols should be de-interleaved, i.e., decoded by 12 Trellis-decoders. Therefore, the symbol is Trellis-decoded by the corresponding one (hereafter referred to as "TSel"-th Trellis decoder") of the 12 Trellis-decoders to obtain the maximum likelihood transmission symbol sequence $M_k$ and the Trellis-decoded output $d_k$ (step S37). This Trellis-decoding will be described later in more detail.

Then, the maximum likelihood estimated transmission symbol $m_k^0$ is outputted as the estimated transmission symbol $y_k$ (step S39). Then, it is determined whether or not the symbol $y_k$ belongs to the Area-F (step S41). If Yes, the symbol is one of the last 12 symbols of the last (i.e., 313th) segment in the data field. As mentioned, the data in this region are duplicated to the last 12 symbols of the subsequent data field sync, and hence the value of the symbol is stored in the aforementioned precode memory (step S43). Then, the feedback register updating process is executed to obtain the new feedback register vector $Z_{k+1}$ corresponding to that time point of the symbol (step S45). This process updates the stored values of the feedback register 43 by the values of the maximum likelihood transmission symbol sequence $M_k$ obtained in step S37, and the detail of which will be described later. Then, the Trellis-decoder is updated to the next one (step S47). This process will also be described later. Then, the process returns to the main routine.

Figure 9:
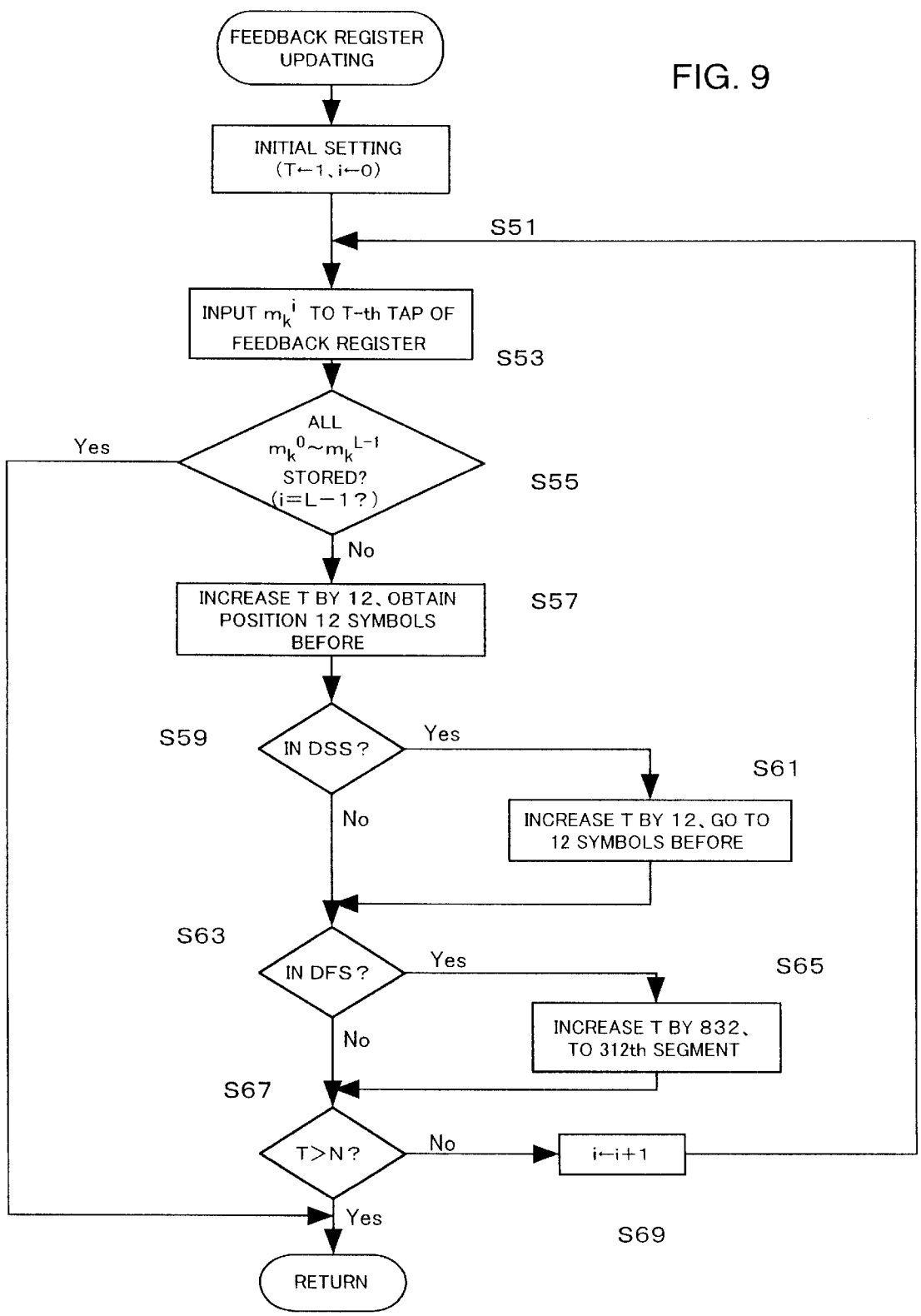
FIG. 9 is a flowchart showing the feedback register updating process in FIG. 8.

Next, the detail of the feedback register updating process executed in step S45 of FIG. 8 will be described with reference to FIG. 9. This process updates the stored values of the feedback register 43 by the maximum likelihood transmission symbol sequence $M_k$ obtained in step S37. First, the variables used in the feedback register updating process are initialized (step S51). Specifically, the variable "T" indicating the updating tap of the feedback register subject to the updating is set to "1", and the variable "i" indicating one of the L maximum likelihood estimated transmission symbols in the maximum likelihood transmission symbol sequence $M_k$ is set to "0". Then, the maximum likelihood estimated transmission symbol $m_k^i$ is inputted to the T-th tap of the feedback register (step S53). In this step, the feedback register updating is sequentially performed by using each maximum likelihood estimated transmission symbol. Then, it is determined whether or not all elements of the maximum likelihood transmission symbol sequence $M_k$, i.e., all of L maximum likelihood estimated transmission symbols $m_k^0$ to $m_k^{L-1}$ are stored in the feedback register taps (step S55). If all maximum likelihood estimated transmission symbols are stored (step S55: Yes), the process returns to the Trellis-decoding/feedback register updating process shown in FIG. 8.

On the other hand, if all maximum likelihood estimated transmission symbols are not stored yet (step S55: No), the tap in the feedback register at which the next maximum likelihood estimated transmission symbol $m_k^{i+1}$ is to be stored is determined. For this purpose, first, the variable T indicating the tap in the feedback register 43 subjected to the updating is increased by 12, and the position in the frame, which is 12 symbol precedent to the current symbol, is determined (step S57). Then, it is determined whether or not the symbol position belongs to the data segment sync (step S59). If Yes, the symbol is not data symbol, and hence the storage position of the symbol $m_k^{i+1}$ is not the tap currently represented by the variable T. So, the variable T is further increased by 12, and the position, which is 12 symbols precedent to the current position, is determined (step S61). Then, it is determined whether or not the position of the symbol thus determined belongs to the data field sync (step S63). If Yes, the symbol is not data symbol and the storage position of the symbol $m_k^{i+1}$ is not the tap currently represented by the variable T. Then, the variable T is further increased by 832, and the symbol position, which is 832 precedent to the current position, is determined (step S65). By those steps S58 to S65, the updating tap T to which the $m_k^{i+1}$ for the next time point is to be stored is correctly set. Finally, it is determined whether the updating tap T for the next time exceeds the tap number of the feedback register 43 (step S67). If it does not exceed, the variable "i" is incremented by one (step S69) and the process goes back to step S53. On the other hand, if it exceeds, the process returns to the Trellis-decoding/feedback register updating process shown in FIG. 8.

By repeating the above steps, each element of the maximum likelihood transmission symbol sequence $M_k$, i.e., the maximum likelihood estimated transmission symbols $m_k^0$, $m_k^1$, $m_k^2$, . . . are stored in the corresponding taps of the feedback register 43. If all of the maximum likelihood estimated transmission symbols are stored (step S55: Yes) or if the updating tap T exceeds the total tap number N of the feedback register 43 (step S67: Yes), the process returns to the Trellis-decoding/feedback register updating process shown in FIG. 8.

Figure 10:
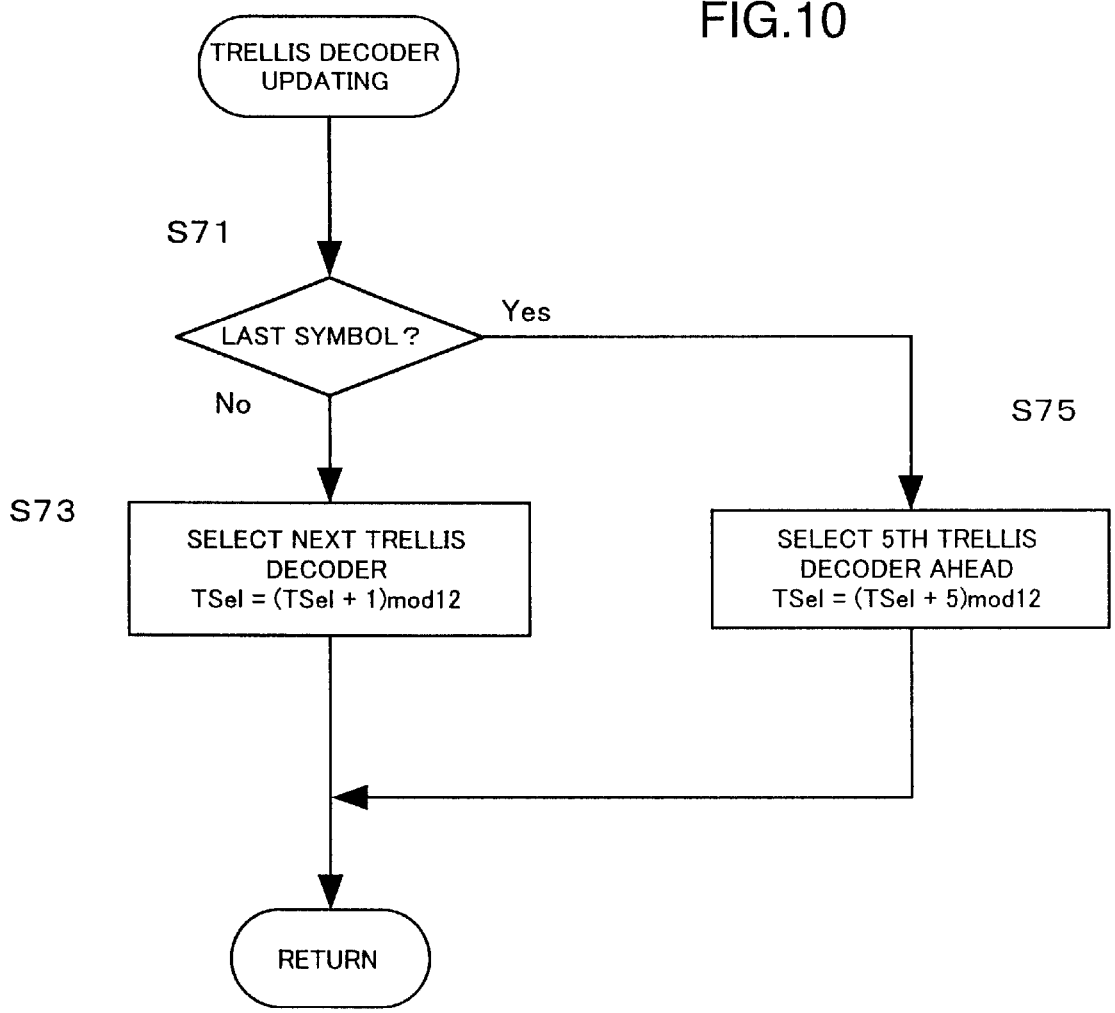
FIG. 10 is a flowchart showing the Trellis decoder updating process in FIG. 8.

Next, the Trellis decoder updating process will be described with reference to FIG. 10. This process determines one Trellis decoder corresponding to a certain data symbol based on the position of the data symbol within the data frame.

First, it is determined whether or not the symbol counter value $f_k$ of the current symbol is "831". If Yes, the symbol is the last symbol in that data segment and the next symbol is at the head of the next data segment. However, as shown in FIG. 4A, the initial four symbols at the head of each data segment are the segment sync and are not Trellis-encoded. Therefore, the next data symbol which needs to be Trellis-decoding is the fifth symbol of that data segment. Since the transmitting system side interleaves the symbols including both data symbols and non-data symbols in the same manner, the non-data symbols has also been assigned to 12 Trellis decoders. So, the next Trellis decoder can be determined by adding "5" to the current TSel value and executing the remainder operation by 12. On the other hand, if the symbol counter value $f_k$ indicating the current symbol position is not "831" (step S71: No), the next symbol is the data symbol. Therefore, the next Trellis decoder is determined by adding "1" to the current TSel value and executing the remainder operation by 12. Thus, the Trellis decoder is updated.

Figure 11:
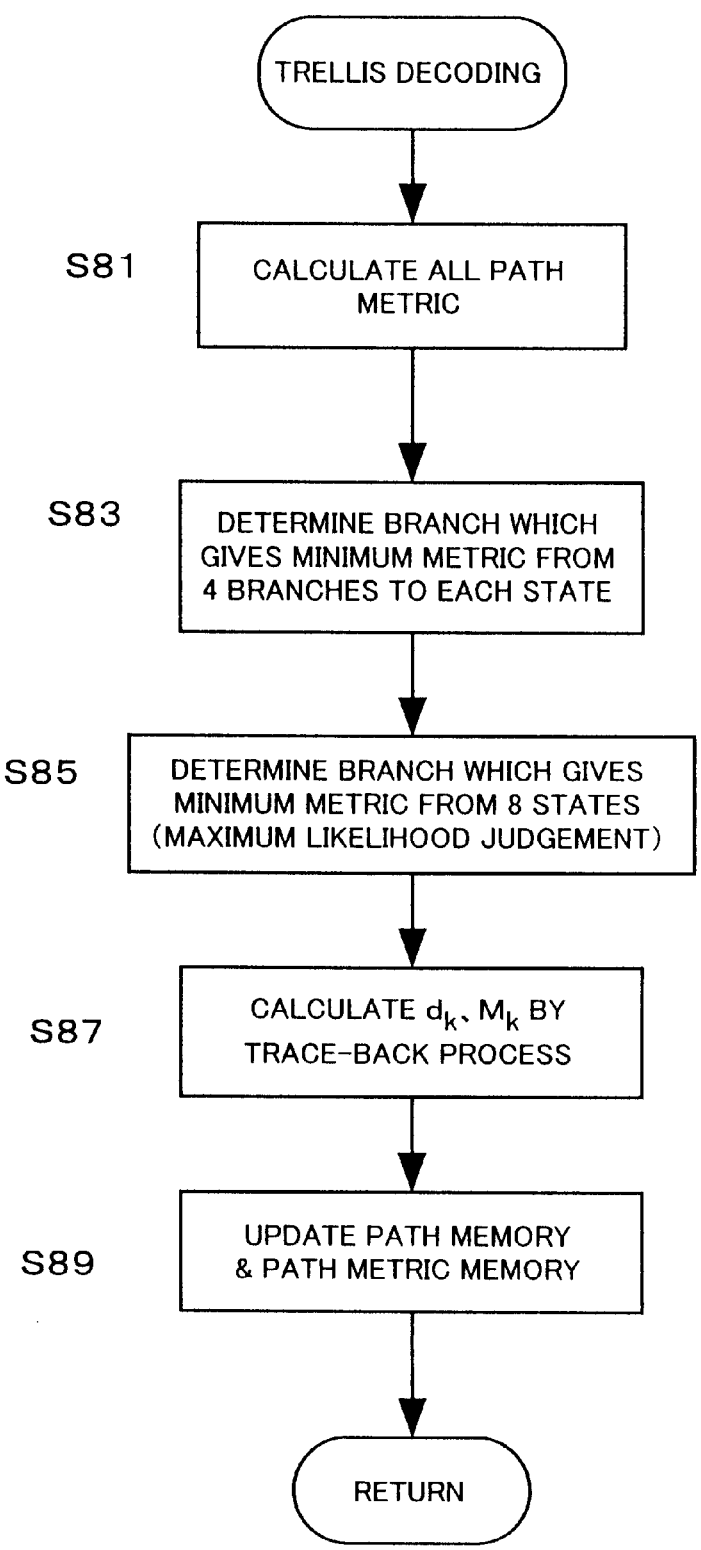
FIG. 11 is a flowchart showing the Trellis decoding process in FIG. 8.

Next, the Trellis decoding process executed in step S37 of FIG. 8 will be described with reference to FIG. 11. This process performs maximum likelihood estimation of the transmission symbol sequence based on the demodulated symbol $x_k$ by Viterbi algorithm, and outputs the decoded 2-bit data $d_k$ and the maximum likelihood transmission symbol sequence $M_k$ corresponding to the maximum likelihood surviving path determined in the Trellis decoding process.

First, all path metric for all branches are calculated by the Viterbi algorithm (step S81), and then a branch having minimum metric is determined from four branches reaching the respective states (step S83). Then, one state which gives minimum metric is obtained from 8 states (step S85). Thus, the maximum likelihood surviving path is determined, and then the maximum likelihood surviving path is traced by the trace-back process to calculate $d_k$ and $M_k$ (step S87). Then, the path metric memory and the path memory are updated according to the maximum likelihood surviving path thus obtained (step S89), and the process ends. In this way, the maximum likelihood transmission symbol sequence $M_k$ corresponding to the maximum likelihood surviving path can be obtained.

[3] Comparative Example

The allowable error rate limit of the ATSC system is about 3.3e−3 when it is evaluated by the symbol error rate (SER) at the Trellis decoder output. However, if the SER at the Trellis decoder output is 3.3e−3, the SER at the output of the slicer in the decision feedback equalizer (DFE) reaches the order of $10^2$. Thus, an appropriate echo elimination is quite difficult if the transmission symbol estimation accuracy in the DFE is low.

Figure 12:
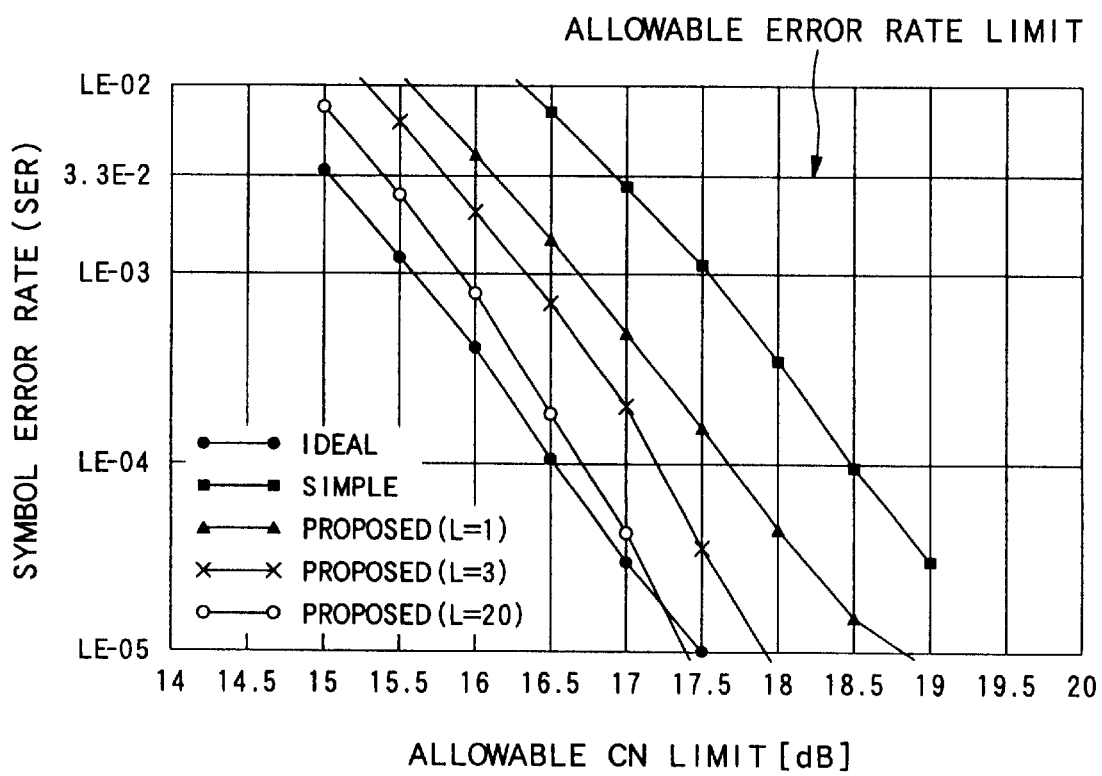
FIG. 12 is a diagram showing the comparative examples of the processing results by the conventional decision feedback equalizer and the decision feedback equalizer according to the present invention.

FIG. 12 shows the comparative examples of the symbol error rate (SER) at the Trellis decoder output in the cases of the decision feedback equalizer using the conventional 8-value slicer and the intelligent equalizer according to the present invention. As seen, the allowable CN limit is 15 [dB] in the no-echo state while 16.8 [dB] in the echo-existing state. This results from the following reasons: (1) Since the estimation accuracy of the estimated transmission symbol is low, the feedback register vector is different from the actual transmission symbol sequence and hence accurate echo cancellation can not be performed. (2) Since the estimation accuracy of the estimated transmission symbol is low, error is introduced to the coefficient updating and hence appropriate coefficient vector for the echo cancellation can not be obtained. On the other hand, according to the intelligent equalizer of the present invention, the allowable CN limit in the echo-existing state is 15.4 [dB] (L=20)–16.2 [dB] (L=1), and is remarkably improved.

As described above, according to the present invention, since the feedback register of the DFE receives the maximum likelihood transmission symbol sequence corresponding to the maximum likelihood surviving path determined in the Trellis decoding process, the high-performance equalization may be achieved, as compared with the DFE using the conventional 8-value slicer, without unacceptable increase of the hardware size.

While the equalization process is described with reference to the flowcharts in the above embodiment, the equalization process of the present invention is not limited to such a software-based implementation. Namely, the equalization process of the present invention can be achieved by various feature such as the software-based implementation by using a DSP or a media processor, the software-based implementation on a personal computer, or the hardware-based implementation by using dedicated LSI. Also, the equalization may be or may not be performed on the real time basis.

In addition, the Trellis decoding process described above is merely an example, and the Trellis decoding by other method -may be used. For example, any evaluation standard other than the Euclidean distance may be used as the metric evaluation standard. Also, the use of the trace-back method is not essential. Namely, what is only needed is the Trellis decoder using the Viterbi algorithm and including the function of calculating the maximum likelihood estimated transmission symbol $M_k$. In this view, while the Trellis decoder 20 outputs the decoded result $d_k$ in FIG. 5, this is not essential. For example, when the equalizer of the present invention is employed in place of the equalizer 1 in FIG. 2B, the whole system can be configured such that the equalizer of the present invention supplies only the demodulated symbol $x_k$ to the following phase tracker and the Trellis decoder 3 outputs the decoding result $d_k$. On the other hand, when the decoding result $d_k$ from the Trellis decoder 20 is used as the Trellis decoding result, the decoding result $d_k$ may be used equivalently to the output from the Trellis decoder 3 in FIG. 2B, on the condition that the necessary phase error compensation is carried out in a certain stage.

Further, various algorithm may be used as the coefficient updating algorithm executed in the coefficient updating unit. Still further, while the equalizer shown in FIG. 5 introduces the frame counter value $f_k$ as the information to specify the position of the symbol within the data frame, the position of the symbol may be determined by other method. For example, the system may be designed to generate information identifying which one of the plural areas shown in FIG. 6 the symbol belongs, and to use this information to specify the position of the symbol.

As described above, the intelligent equalizer of the present invention executes the Trellis decoding onto the demodulated symbol $x_k$ to generate the maximum likelihood transmission symbol sequence $M_k$, and utilizes this sequence $M_k$ to update the feedback register and the coefficient. Since the maximum likelihood transmission symbol sequence $M_k$ has higher accuracy than the transmission symbol estimation result by the conventional 8-value slicer, the delay echo cancellation and the equalization coefficient updating may be carried out with higher accuracy.

Further, when the input symbols are sequentially inputted, the maximum likelihood transmission symbol sequence is calculated based on the newly inputted symbols, and the stored values in the feedback register may be updated at every moment. Therefore, the echo estimation value is always calculated based on the highly-accurate estimated transmission symbols, and this enables further improvement of the accuracy in the echo cancellation and the equalization.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications Nos. 11-72631 filed on Mar. 17, 1999 and 11-292584 filed on Oct. 14, 1999 including the specification, claims, drawings and summary is incorporated herein by reference in its entirety.

What is claimed is:

1. A decision feedback equalizer for use in a digital signal receiving system, comprising:
    an adder for subtracting an estimated echo from an input symbol to generate a demodulated symbol;
    a Trellis decoder for applying Trellis decoding onto the demodulated symbol to generate a maximum likelihood transmission symbol sequence;
    a feedback register for storing estimated transmission symbol values for a feedback filter;
    a coefficient register for storing coefficient values for the feedback filter;
    a feedback register updating unit for generating an estimated transmission symbol and the estimated transmission symbol value corresponding to a next time point based on the demodulated symbol, the maximum likelihood transmission symbol sequence and the estimated transmission symbol value corresponding to a current time point, and for updating the values stored in the feedback register by using the estimated transmission symbol value corresponding to the next time point;
    a coefficient updating unit for updating the values stored in the coefficient register based on the demodulated symbol and the estimated transmission symbol; and
    an estimated echo calculator for calculating the estimated echo based on the values stored in the feedback register and the values stored in the coefficient register.

2. An equalizer according to claim 1, wherein the Trellis decoder outputs a decoding result corresponding to the maximum likelihood transmission symbol sequence.

3. An equalizer according to claim 1, wherein the feedback register updating unit updates all of the values stored in the feedback register by using the maximum likelihood transmission symbol sequence.

4. An equalizer according to claim 1, wherein the feedback register updating unit calculates the estimated transmission symbol corresponding to a past input symbol by using the maximum likelihood transmission symbol sequence which is calculated by the Trellis decoder and corresponds to input symbol until a current time point, and updates the values stored in the feedback register by using the estimated transmission symbol corresponding to the past input symbol.

5. An equalizer according to claim 1, wherein the Trellis decoder applies the Trellis decoding only to data symbols included in the demodulated symbols.

6. An equalizer according to claim 5, wherein the Trellis decoder receives a frame counter value indicating a position of the demodulated symbol within a data frame, and applies the Trellis decoding only to the data symbols based on the frame counter value.

7. An equalizer according to claim 4, wherein the feedback register updating unit receives a frame counter value indicating a position of the demodulated symbol within a data frame, and updates the values stored in the feedback register by using the estimated transmission symbol corresponding to the past input symbol, only for the data symbols based on the frame counter value.

8. An equalizer according to claim 1, wherein the maximum likelihood transmission symbol sequence is an aggregation of the maximum likelihood estimated transmission symbols corresponding to current and past input symbols.

9. An equalizer according to claim 1, wherein the coefficient updating unit updates the values stored in the coefficient register corresponding to a next time point based on the demodulated symbol, the estimated transmission symbol, the estimated transmission symbol value of a current time point and the coefficient value of the current time point.

10. An equalizer according to claim 1, wherein data symbol corresponding to the input symbol supplied to the equalizer is interleaved by a plurality of Trellis encoders, and the Trellis decoder comprises a plurality of Trellis decoding units for de-interleaving the demodulated symbol.

11. A decision feedback equalizer for use in a digital signal receiving system, comprising:
   an adder for subtracting an estimated echo signal from an input signal to generate a demodulated signal;
   a decoder for decoding the demodulated signal to generate a maximum likelihood transmission signal;
   a feedback register for storing estimated transmission signal values for a feedback filter;
   a coefficient register for storing coefficient values for the feedback filter;
   a feedback register updating circuit for generating an estimated transmission signal and updating the values stored in the feedback register based on the maximum likelihood transmission signal;
   a coefficient updating circuit for updating the values stored in the coefficient register based on the estimated transmission signal; and
   an estimated echo signal calculator for calculating the estimated echo signal based on the values stored in the feedback register and the values stored in the coefficient register.

12. An equalizer according to claim 11, wherein the decoder comprises a Trellis decoder.

13. An equalizer according to claim 11, wherein the decoder outputs a decoding result corresponding to the maximum likelihood transmission signal.

14. A decision feedback equalizer for use in a digital signal receiving system, comprising:
   means for subtracting an estimated echo signal from an input signal to generate a demodulated signal;
   means for decoding the demodulated signal to generate a maximum likelihood transmission signal;
   first storing means for storing estimated transmission signal values for a feedback filter;
   second storing means for storing coefficient values for the feedback filter;
   means for generating an estimated transmission signal and updating the values stored in the first storing means based on the maximum likelihood transmission signal;
   means for updating the values stored in the second storing means based on the estimated transmission signal; and
   means for calculating the estimated echo signal based on the values stored in the feedback register and the values stored in the coefficient register.

15. A decision feedback equalizing method for use in a digital signal receiving system, comprising:
   subtracting an estimated echo signal from an input signal to generate a demodulated signal;
   decoding the demodulated signal to generate a maximum likelihood transmission signal;
   storing estimated transmission signal values for a feedback filter;
   storing coefficient values for the feedback filter;
   generating an estimated transmission signal and updating the stored estimated transmission signal values stored in the feedback register based on the maximum likelihood transmission signal;
   updating the stored coefficient values based on the estimated transmission signal; and
   calculating the estimated echo signal based on the values stored in the feedback register and the values stored in the coefficient register.

16. The method according to claim 15, wherein the decoding comprises Trellis decoding.

17. The method according to claim 15, further comprising:
   outputting a decoding result of the decoding.

18. The method according to claim 15, wherein the decoding is applied only to data included in the demodulated signal.

19. The method according to claim 18, wherein the decoding is based on a frame counter value indicating a position of the demodulated signal in a data frame and the decoding is applied only to the data based on the frame counter value.

* * * * *